United States Patent
Brunswig et al.

(10) Patent No.: US 8,838,627 B2
(45) Date of Patent: Sep. 16, 2014

(54) SYSTEMS AND METHODS FOR PROVIDING TEMPLATE BASED OUTPUT MANAGEMENT

(75) Inventors: Frank Brunswig, Heidelberg (DE); Wolfgang M. Koch, Orhingen (DE); Olaf Meinchke, Heidelberg (DE)

(73) Assignee: SAP AG, Walldorf (DE)

( * ) Notice: Subject to any disclaimer, the term of this patent is extended or adjusted under 35 U.S.C. 154(b) by 1859 days.

(21) Appl. No.: 11/442,297

(22) Filed: May 30, 2006

(65) Prior Publication Data

US 2007/0282616 A1    Dec. 6, 2007

(51) Int. Cl.
- G06F 7/00 (2006.01)
- G06F 17/30 (2006.01)
- G06Q 10/06 (2012.01)

(52) U.S. Cl.
CPC .............. *G06Q 10/06* (2013.01); *G06Q 10/067* (2013.01)
USPC ............................ 707/756; 707/781; 707/803

(58) Field of Classification Search
USPC ....................................................... 707/102
See application file for complete search history.

(56) References Cited

U.S. PATENT DOCUMENTS

| | | | | |
|---|---|---|---|---|
| 6,631,497 | B1 * | 10/2003 | Jamshidi et al. | 715/205 |
| 7,281,018 | B1 * | 10/2007 | Begun et al. | 707/102 |
| 2004/0002972 | A1 * | 1/2004 | Pather et al. | 707/6 |

* cited by examiner

*Primary Examiner* — Ann Chempakaseril
(74) *Attorney, Agent, or Firm* — Mintz Levin Cohn Ferris Glovsky and Popeo, P.C.

(57) ABSTRACT

Methods and apparatus, including computer program products, are provided for template based output management. In one exemplary embodiment, the method may be implemented by a generic output data service. The method includes calling the service to retrieve the template for formatting the output document, the document having one or more data fields, retrieving a schema defining one or more data elements, retrieving binding data mapping the one or more data elements to one or more data fields of the document, and generating the output document formatted based on the retrieved template, the retrieved schema, and the retrieved binding data.

18 Claims, 6 Drawing Sheets

Purchase Order Summary

You have purchased 15 SAP Business One business/operational management solution. Thank you.

| SAP B One | 12/01/2005 |
|---|---|
| ⋮ | ⋮ |

FIG. 3C

SYSTEMS AND METHODS FOR PROVIDING TEMPLATE BASED OUTPUT MANAGEMENT

FIELD OF THE INVENTION

The present invention generally relates to data processing. More particularly, the present invention relates to systems and methods for template based output management.

BACKGROUND OF THE INVENTION

There is, and will continue to be, advances and changes in how enterprises conduct business. Whether these advances and changes occur through growing competition and globalization, mergers and acquisitions, or a revamping of business models, the key for success will often depend on how quickly the enterprise's information technology (IT) organization can adapt to evolving business needs. Therefore, a major challenge to these enterprises is how they handle change.

For organizations to enable business agility, they must ensure that enterprise applications are not only high-performance business engines driving efficiencies, but also that they become flexible building blocks of future business systems. A recent promising solution has risen in the form of services. A service, such as a Web service or program, represents a self-contained, self-describing piece of application functionality that can be found and accessed by other applications. A service is self-contained because the application using the service does not have to depend on anything other than the service itself, and self-describing because all the information on how to use the service can be obtained from the service itself. The descriptions are centrally stored and accessible through standard mechanisms.

Instead of requiring programmers to establish and maintain links between applications, services are loosely coupled, making connections simpler and more flexible and allowing application architects to more easily find and understand services offered by other cooperative applications. However, the problem that exists with services is that they are often designed to expose functionality of individual applications and thus may be too limited to be efficient building blocks for enterprise-wide business processes. A solution to this shortfall has been the migration to a Service Oriented Architecture (SOA). The SOA is an open architecture middleware, which builds on the benefits of services. An example of an SOA can be found in the Enterprise Service Framework (ESF), which is commercially available from SAP AG, Walldorf, Germany. The term "SOA" may also be used to refer to "distributed objects" architecture, such as CORBA (Common Object Request Broker Architecture) and DCOM (Distributed Component Object Model). SOA enables aggregating services into business-level enterprise services to provide more meaningful building blocks for the task of automating enterprise-scale business scenarios. ESF allows IT organizations to efficiently develop composite applications, defined as applications that compose functionality and information from existing systems to support new business processes or scenarios.

The SOA also enables the use of an enterprise services repository. The enterprise services repository stores relevant pre-existing enterprise services and makes them available for use by, for example, selected partners and customers. By using the enterprise services repository, these selected partners and customers can use the pre-existing enterprise services to facilitate in the implementation of new services and corresponding business objects. The term business object (BO) represents an object having significance to a business.

An "object" refers to a software bundle of variables (e.g., data) and related methods. The business object may be implemented as a data structure that is stored in a database. Moreover, in object-oriented programming, an "object" is a concrete realization (an instance) of a class that consists of data and the operations associated with that data. An example of a business object is a purchase order business object having data and related methods. When a purchase order business object is instantiated, a user may interact with the purchase order by, for example, providing data for fields in the purchase order.

Output management usually refers to capturing information from a source and to delivering the captured information in an appropriate format to a destination. For example, an application, such as a word processing program or a database management program, may include an output management mechanism to format a document based on the type of output, such as print, facsimile, electronic mail (email), presentation on the web in HTML (hyper text markup language), or presentation on a mobile wireless device in WML (wireless markup language). To format a document into an appropriate output format, an application may use a template. However, the template used by the application may be specific to that application. For example, a word processing application may use a template specific to the word processing program to format an output. And a database management application may use another template specific to the database management application to format the same output. Thus, traditional output management may result in multiple templates, which are unique to their applications. As such, there is a need for improved output management in a service oriented architecture.

SUMMARY OF THE INVENTION

The present invention provides methods and apparatus, including computer program products, for providing template based output management.

Methods and apparatus, including computer program products, are provided for template based output management. In one exemplary embodiment, a method may be provided for generating an output document based on a template using a service. The method may include, for example, calling the service to retrieve the template for formatting the output document, the document having one or more data fields; retrieving, by the service, a schema defining one or more data elements; retrieving, by the service, binding data mapping the one or more data elements to one or more data fields of the document; and generating the output document formatted based on the retrieved template, the retrieved schema, and the retrieved binding data.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the present invention and, together with the description, help explain some of the principles associated with the invention. In the drawings.

FIG. 3C illustrates an exemplary output document consistent with certain aspects related to the present invention.

DESCRIPTION OF THE EMBODIMENTS

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1:
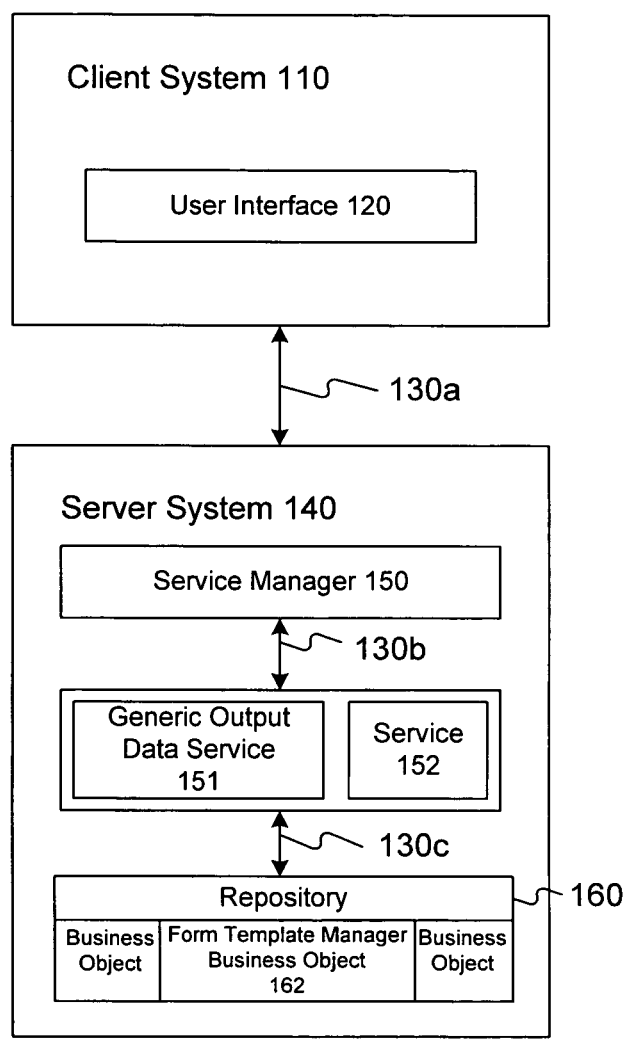
FIG. 1 illustrates a block diagram of an exemplary system environment consistent with certain aspects related to the present invention.

FIG. 1 is a block diagram of an exemplary system environment 100 that includes a client system 110 and a server system 140. Client system 110 may include a user interface 120. Server system 140 may include a service manager 150, services 151 and 152, and a repository 160. A user at a user interface 120 may interact with a service, such as services 151 or 152, through a service manager 150, to request an output in the form of a document. For example, a user at user interface 120 may request that a purchase order be generated in a format, which can be printed or sent by facsimile. When service manager 150 receives the request to output the document, service manager 150 may instantiate an instance of a service, such as a generic output data service 151. Generic output data service 151 is a service that may be called by service manager 150 to provide output management, such as formatting an output document. To generate an output document, generic output data service 151 may retrieve data, such as text or numerical values, for the document and format the document based on a form template. The form template can be predetermined as a default template or selected at runtime. The output document may be of any type, such as text file, image file, or the like, that conveys information. Examples of output documents include an HTML (Hypertext Markup Language) document presented by a web browser, a WML (Wireless Markup Language) document displayed by a mobile wireless device, an email, a facsimile, a printed page, and the like. The use of generic output data service 151 provides a standard interface accessible to users at user interface 120 and to other services (e.g., service 152) to access templates for generating output documents.

System 100 may be implemented as part of an enterprise services framework (ESF). An enterprise services framework is a type of computer framework, such as a client-server architectural framework, that includes one or more services. The services are accessible to other parts of the ESF, such as client systems and their corresponding users, through a communication mechanism such as the Internet or an intranet. For example, generic output data service 151 may be a service available to other services, applications, and users to format a document based on a template. The ESF may be constructed using tools provided by SAP Netweaver™ (commercially available from SAP AG, Walldorf, Germany). Although FIG. 1 shows a single client system 110 and a single server system 140, a plurality of client systems and server systems may be used. Moreover, the components depicted in FIG. 1 may be distributed among multiple locations. Although FIG. 1 is described with respect to a client-server architecture and an ESF, system 100 can also use any other architecture or framework.

Client system 110 may include one or more processors, such as computers to interface with other computers, such as server system 140. Client system 110 may also include user interface 120. User interface 120 may provide an interface to allow a user to interact, through service manager 150, with applications, such as services 151-152 and their corresponding business objects stored in repository 160. Moreover, a service, such as service 152 may call another service, such as service 151. A user may be any type of user, such as a system designer, a software developer, and/or a processor. User interface 120 may include a browser to provide content from, and allow interaction with, services 151-152. In some implementations, SAP Web Dynpro (commercially available from SAP AG, Walldorf, Germany) may be used as a model-based development environment for generating user interface 120, although other development environments can also be used.

Network connections 130a-c may be any type of communications mechanism and may include, alone or in any suitable combination, a telephony-based network, a local area network (LAN), a wide area network (WAN), a dedicated intranet, wireless LAN, the Internet, an intranet, a wireless network, a bus, or any other communication mechanisms. Further, any suitable combination of wired and/or wireless components and systems may provide network connection 130. Moreover, network connection 130a-c may be embodied using bi-directional, unidirectional, or dedicated communication links. Network connection 130 may also implement standard transmission protocols, such as Transmission Control Protocol/Internet Protocol (TCP/IP), Hyper Text Transfer Protocol (HTTP), SOAP, RPC, or other protocols.

Server system 140 may include one or more processors, such as computers, to interface with other computers, such as client system 110. Client system 110 may call service manager 150 at server 140. Although service manager 150 is depicted within server 140, service manager 150 can be located anywhere and distributed among multiple locations.

Further, when called by client system 110, service manager 150 may call a procedure or method to instantiate one or more of the services 151-152. A service is resource that is able to perform a coherent set of tasks or interactions upon a request, such as a request from a user or consumer. An example of a service is a Web service, although any other type of application may be used. When services 151-152 are instantiated by service manager 150, they may also instantiate and then access one or more of their corresponding business objects, such as form template manager business object 162.

Services, such as service 152, may be implemented as a so-called "core" service. A core service may refer to a service, such as a program, application, or Web service, which provides basic operations to other entities, such as other services within a framework. Examples of core services include the following operations which may be performed on data associated with a business object: create, delete, update, retrieve, and retrieve by associations. Moreover, the granularity of a core service may be implemented to have fine granularity to allow a portion of the attributes or an individual attribute to be accessed or manipulated by a single operation. For example, service 152 may be a core service to generate a the shipping address of a purchase order during a transaction. The business object purchase order may include attributes associated with customer information (e.g., customer name, address, etc.), order information (e.g., order ID, date, etc.), and ordered product information (e.g., ordered product, product description, etc.). Header information may be included in the purchase order to provide an index for accessing the information. Further, the business object purchase order may allow access to certain attributes individually without accessing other attributes. For example, client system 110 may access customer information without accessing order information. Alternatively, client system 110 may access only customer name only. The amount of data exchanged between client system 110 and the service 152 may be limited to only the requested information.

Services, such as service 152, may also be implemented as a so-called "compound" service. A compound service refers to a service having a coarse granularity of operation, when compared to a core service. The coarse granularity may allow some (if not all) of the attributes to be accessed or manipulated by a single operation. Referring back to the above example of the purchase order, service 152 may be a compound service to generate a purchase order. However, the compound service purchase order generation may provide a limited interface that may require client system 110 to access all attributes in a single access, which may result in a larger amount of data being transferred between the service 152 and the client system 110, when compared to a core service.

Repository 160 may be implemented as a storage device for storing information associated with business objects including their metadata. FIG. 1 shows repository 160 containing business objects, including a form template manager business object 162 for providing data and related methods for generating an output document using a form template. Services 151 and 152 may be called at runtime to retrieve a form template from repository 160 to format data for output as a document. The term "runtime" refers to any time when system 100 is generating an output. The terms "form template" and "template" are used interchangeably in this disclosure to refer to a pattern or a format used to generate an output document.

In one embodiment consistent with aspects of the present invention, service 151 may be a generic output data service, which can be called by other applications and services, such as service manager 150. When called, generic output data service 151 may instantiate form template manager business object 162, retrieve data from the instance of form template manager business object 162 (e.g., templates to format an output of a document), and generate a requested output document.

For example, user interface 120 may send a SOAP (simple object access protocol) message to service 152 to allow a user to request purchase orders. The user may be prompted to select the output format or mechanism in which to send the purchase order to a vendor. When the user selects, for example, sending the purchase order by email, service 152 may call generic output data service 151 with a request to format an output document, which in this example is a purchase order formatted for transmission by email. When called, generic output data service 151 may instantiate form template manager business object 162. Generic output data service 151 may then access form template manager business object 162, querying it for the appropriate template, which in this case is a template for emailing a purchase order. When the appropriate template is identified and retrieved, generic output data service 151 may retrieve output data associated with the document being formatted (e.g., data associated with the purchase order business object) and then generate the output document (e.g., the purchase order form) based on the retrieved output data and template. When the user selects another output format, such as a facsimile, service 152 calls generic output data service 151 with a request to format an output document as a facsimile. Generic output data service 151 may access form template manager business object 162 to search repository 160 for the appropriate template, which in this case is a template for sending a purchase order form by facsimile. When the appropriate template is found and retrieved, generic output data service 151 may access form template manager business object 162 to retrieve data from a purchase order business object and then generate the purchase order form based on the retrieved data and the template associated with a facsimile.

Repository 160 may also store metadata regarding one or more business objects. Metadata may be defined as data about data. Metadata may refer to information about the data itself, such as content, quality, condition, origin, size, formatting, characteristics of data, and the like. The extensible Markup Language (XML) is a specific example of metadata because it is a format used to define other data objects. For example, repository 160 may store metadata describing the structure of form template manager business object 162. Metadata may also include a schema describing an output form template that is used by form template manager business object 162. A schema is an organization or structure, such as the organization of a database or the structure of an object in an object oriented program, which can be stored in repository 160. A schema may be depicted visually as a structure or a formal text-oriented description (e.g., script). An exemplary XML data schema is further described below in relation to FIG. 2A.

Figure 2A:
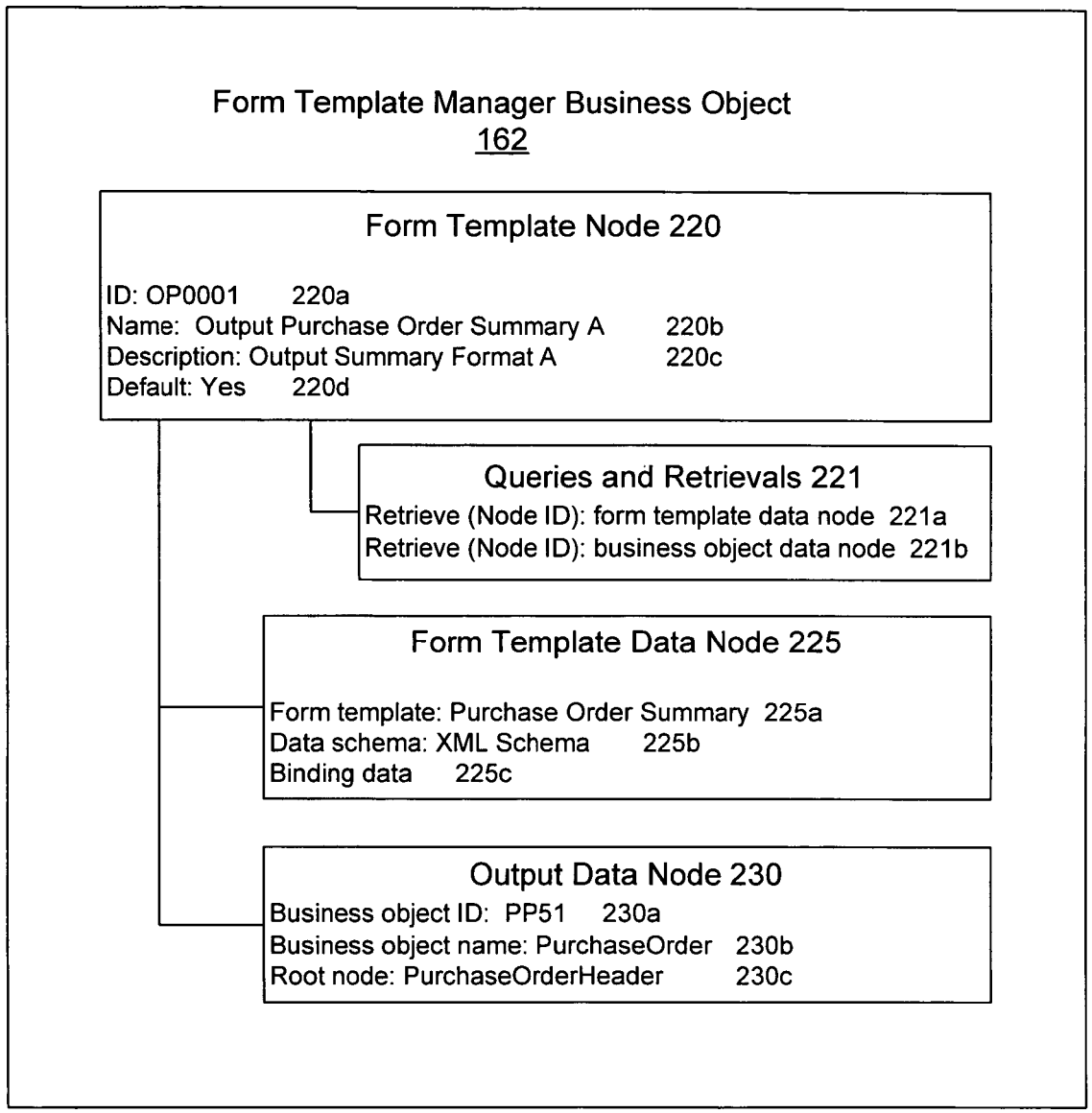
FIG. 2A illustrates another block diagram of a form template manager business object consistent with certain aspects related to the present invention.

FIG. 2A depicts an exemplary form template manager business object 162 consistent with certain aspects of the present invention. A business object may contain many business object nodes. A business object node refers to a portion of a business object. The business object nodes of a business object may form a data structure, such as the tree structure depicted in FIG. 2A. A business object may also include predefined queries that retrieve data (e.g., retrieve, from a business object, data for a requested output document) and queries that use the retrieved data to access other associated business objects and/or nodes. Like other business objects, form template manager business object 162 may be stored in the repository 160, may be accessible (i.e., callable) by other services and applications, and may have the same basic schema, such as having a node 220 and basic operations, such a query, a retrieve, a retrieve by association, an update, and/or a delete. Unlike other business objects, form template manager business object 162 may include template information (e.g., form template data node 225) and output data to be formatted (e.g., output data node 230) using the template information. Moreover, the template information and output data may be determined at runtime based on the output being requested by the client system 110, service manager 150, and/or other services, such as service 152.

Form template manager business object 162 includes data and methods associated with generating an output document using a form template. Form template manager business object 162 may include a form template node 220, queries and retrievals 221, a form template data node 225, and an output data node 230.

Form template node 220 may be a business object node for identifying an instance of the form template manager business object 162. Queries and retrievals 221 may include predefined queries that retrieve data to generate an output document, such as data for a template from form template data node 225, or data content for the output document from output data node 230. Form template data node 225 may be a business object node containing form template 225a for formatting the output document. Output data node 230 may identify business objects and business object nodes containing the data content for the output document. A data service, such as generic output data service 151, may access (also referred to as traverse) form template manager business object 162 to call queries and retrievals 221 to retrieve data from form template data node 225, and data content from output data node 230 when a call is received to format an output document. Generic output data service 151 may then use the retrieved output template and data content to generate an output requested by user interface 120 or by another service.

Form template node 220 may serve as a so-called "root" node to form template manager business object 162. The root node of a business object refers to the business object node that may not have a parent node, but may have child nodes, such as nodes 222 and 225. All nodes of a business object may form a data structure, such as the tree structure shown in FIG. 2A. A business object root node, such as form template node 220, may include key information of its associated business object, such as the identification (i.e., ID 220a) of the business object, the names of the business object (i.e., name 220b), etc. An ID of a business object, such as ID 220a, may refer to an identifying memory address of a business object that uniquely identifies the individual business object nodes (e.g., nodes 220, 225, 230). An ID of a business object may also include a directory structure and filename associated with the business object. Form template node 220 may include an ID 220a referring to an instance of the form template manager business object 162, a name 220b referring to the name of the instance, a description 220c referring to a description of the instance of the form template manager business object 162, and a default flag 220d identifying whether the template identified in from template data node 225 is a default template.

Queries and retrievals 221 may include predefined queries that may access and retrieve data from business object nodes of form template manager business object 162. For example, queries and retrievals 221 may include retrieval 221a that retrieves data from form template data node 225, and another retrieval 221b that retrieves data from output data node 230.

In one embodiment consistent with certain aspects of the present invention, when a user, through user interface 120, requests that a document be formatted for output (e.g., print a purchase order), user interface 120 may interact with generic output data service 151 through service manager 150. Generic output data service 151 may instantiate form template manager business object 162 by using the parameters from the request from user interface 120 (e.g., parameters to identify which template to use to format the requested output document). For example, user interface 120 may request a purchase order output with a purchase order ID of "PP51" in a summary format (e.g., purchase order summary format). Generic output data service 151 may then instantiate form template manager business object 162 by setting the parameters, such as, ID 220a as "OP001," form template 225 as "purchase order summary," and business object ID 230 as "PP51," in form template manager business object 162. ID 220a "OP001" indicates the memory address of the instance of form template manager business object 162. Generic output data service 151 may then traverse the instance of form template manager business object 162 (by following ID 220a to access object 162) to run queries and retrievals 221 to retrieve data from business object nodes to generate the requested output document.

If an output request for a document does not specify a template, generic output data service 151 may traverse form template manager business object 162 to run a query (not shown) defined in queries and retrievals 221 to retrieve all form templates (e.g., purchase order template in summary format, purchase order template in detail format, and the like) that may be used to generate a formatted purchase order output. Generic output data service 151 may then present the retrieved list of templates through user interface 120, so that a user may select a desired template. By way of example, a user may choose a summary format from the presented list of purchase order templates. Alternatively, if the user does not select an output format, a default output template may be used to generate the requested output. The default template is marked by default flag 220d. In FIG. 2A, form template purchase order summary 225a is marked as the default template for generating a purchase order output. That is, purchase order summary 225a would be used to format a purchase order output if a user does not specify the output template.

Form template data node 225 may include a form template 225a stored together with its metadata, such as data schema 225b that describes a data format. For example, form template 225a may be an HTML template that describes the layout of an output document, such as positions for the header and data fields in the output document. A data field in form template 225a refers to a specific area of an output document that is allocated for a mapped data element. A data element refers to a unit of data, such as a purchase order ID, a product ID, etc., defined in data schema 225b.

Form template data node 225 may include a data schema such as a purchase order XML schema 225b. Purchase order XML schema 225b may include data elements (e.g., purchase order ID) that may appear in form template 225a. Purchase order XML schema 225b may be considered metadata and stored in repository 160. For example, Table 1 below depicts an exemplary purchase order XML schema for a purchase order.

TABLE 1

Purchase Order XML Schema

```
1  <xs:schema
2  xmlns:xs="www.SAP.com/Example Purchase Order XMLSchema">
3    <xs:element name="Purchase Order">
4      <xs:complexType>
5        <xs:sequence>
6  <xs:element name="Order ID" type="xs:string"/>
7  <xs:element name="Order Date" type="xs:date"/>
8  <xs:element name="Product Quantity" type="xs:integer"/>
9  <xs:element name="Order Product" type="xs:string"/>
10 <xs:element name="Product Description" type=""xs:string"/>
11       </xs:sequence>
12     </xs:complexType>
13   </xs:element>
14 </xs:schema>
```

The XML schema in Table 1 is a simple schema describing a purchase order (e.g., "Purchase Order"). A purchase order may be described by a purchase order ID (e.g., "Order ID"), a purchase order date (e.g., "Order Date"), a purchased product quantity ("Product Quantity"), an ordered product (e.g., "Order Product"), and a description of the ordered product ("Product Description"). The data elements of the schema would thus be, for example, "Order ID," "Order Date," and the like.

Form template data node 225 may include a binding data 225c that maps data elements of data schema 225b to data fields in form template 225a. Binding data 225b defines the placement of data elements of data schema 225b in an output document formatted according to form template 225a. Binding data 225c may be generated when a form template is created by a user, although it may be generated at other times. For example, if one of the data elements comprises an ordered product such as "SAP B One," binding data 225c maps the value "SAP B One" into the correct data field in form template 225a.

Figure 2B:
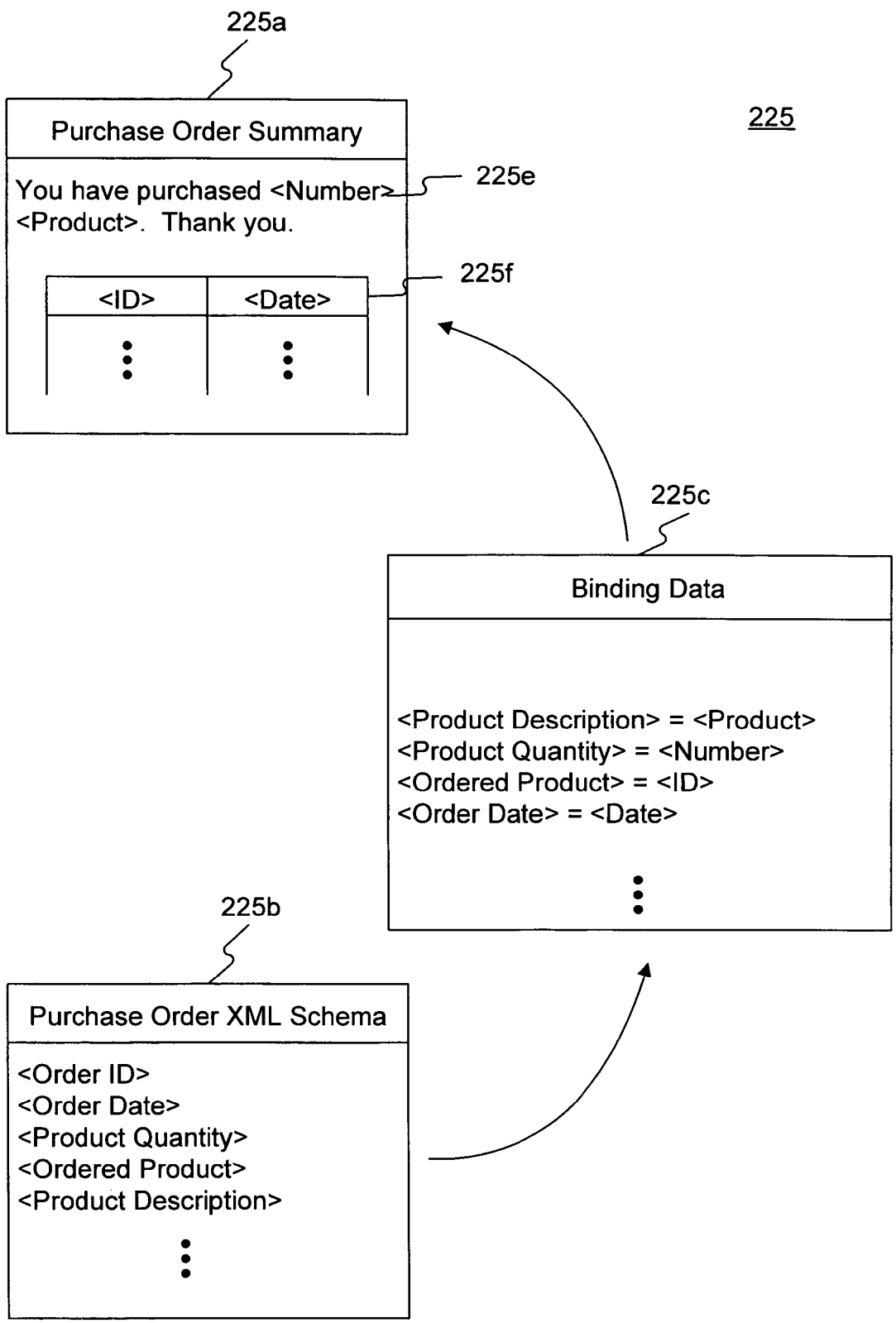
FIG. 2B illustrates another block diagram of business object nodes including an output template, a data schema and binding data consistent with certain aspects related to the present invention.

FIG. 2B further depicts an exemplary form template data node 225 with three business object nodes, purchase order summary form template 225a, purchase order XML (extensible markup language) schema 225b, and binding data 225c. Form template 225a may be an HTML template for a purchase order in summary format. Form template 225a may include a summary line 225e, which may present summary information of a purchase order including two data fields, "number" and "product." Form template 225a may further include a table 225f of ordered items listed on the purchase order, with one data element in each column of the table. Purchase order XML schema 225b may include data elements that may appear in form template 225a. Binding data 225c may include information mapping data elements of purchase order XML schema 225b and the data fields in purchase order summary 225a. For example, binding data 225c may indicate that the "product description" data element from purchase order XML schema 225b maps to the "product" data field in purchase order summary 225a, and that the "product quantity" data element from purchase order XML schema 22b maps to the "number" data field in purchase order summary 225a, and "ordered product" maps to "ID," and "ordered date" maps to "date," etc. Binding data 225c may also include data defining the cardinality of the data elements. For example, binding data 225c may indicate that data element "ordered product" from XML schema 225b would populate the first column of table 225f. The cardinality defined in binding data 225c may define how many instances of "ordered product" may be included in table 225f.

Returning to FIG. 2A, output data node 230 may list business objects that contain data content used for generating an output document. In the purchase order example, output data node 230 may list a business object ID 230a, a business object name 230b, which identifies the business object containing the data content for generating the purchase order output. Output data node 230 may also identify the root node of the purchase order business object 230a, such as purchase order header 230c. When fulfilling a request for an output document, generic output data service 151 may traverse form template manager business object 162 to run query 221b to retrieve data content for the output document from business object node 230.

Figure 3A:
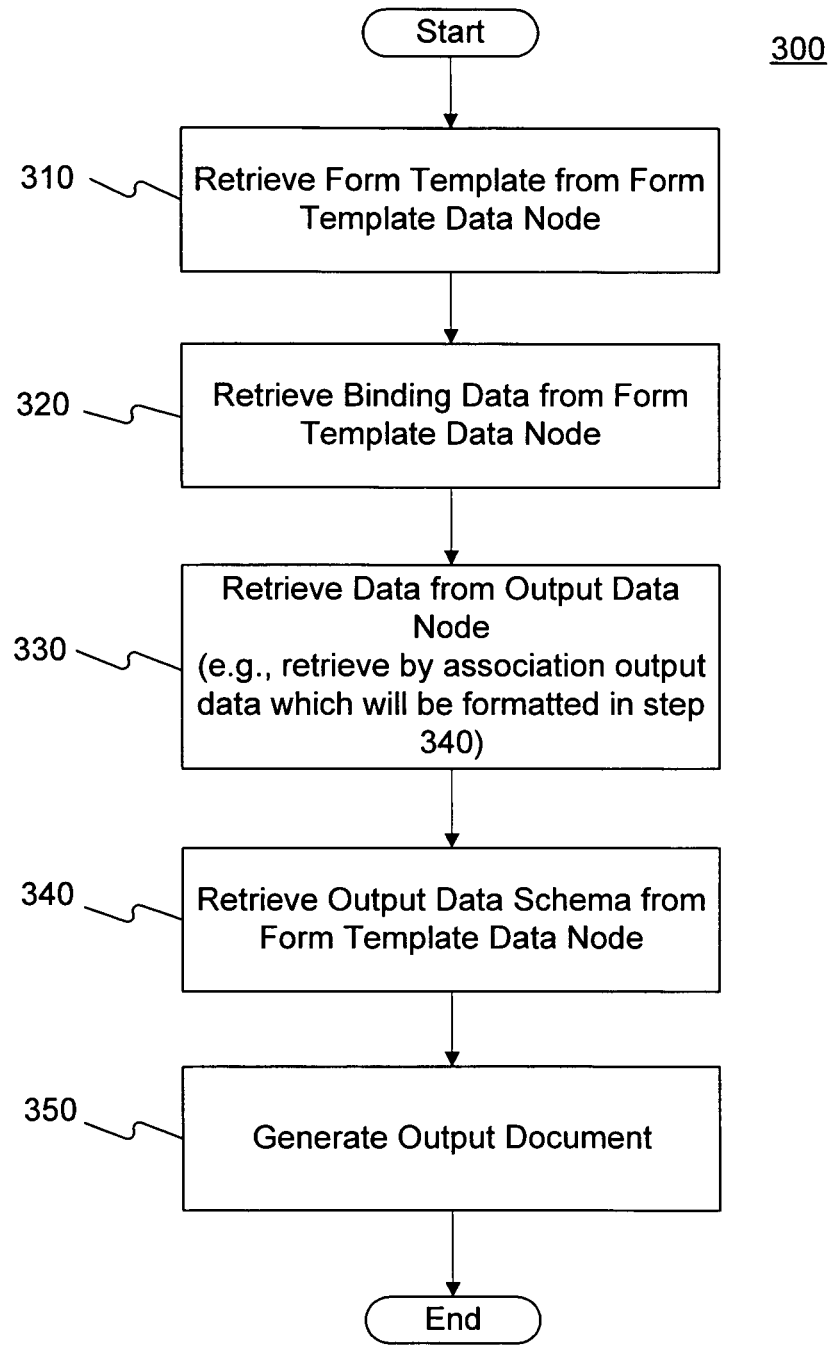
FIG. 3A illustrates a flow chart with exemplary steps for generating an output document consistent with certain aspects related to the present invention.

FIG. 3A is a flowchart of exemplary steps for generating an output document based on a template from a service, such as the generic output data service 151. A user may request an output document in a selected format through user interface 120. Based on the request from user interface 120, service manager 150 may instantiate an instance of generic output data service 151 to fulfill the output request.

For example, a user may request that a purchase order document, such as a purchase order with an ID of "PP51," be formatted in a so-called "summary format" using a form template. Service manager 150 may instantiate an instance of generic output data service 151 to fulfill this purchase order output request. Generic output data service 151 may use the identification data of form template 225a and the ID of the business object ID 230a to instantiate a form template manager business object 162, by setting form template 225a to "purchase order summary," business object ID 230a to "PP51."

Generic output data service 151 may then retrieve a form template that may be used to fulfill the output request (step 310). Referring back to the purchase order example, the user may identify the desired output format, e.g., purchase order summary, when making the request for an output document. Generic output data service 151 may then traverse form template manager business object 162 to run retrievals 221a to retrieve form template 225a (e.g., purchase order summary) from form template data node 225.

After retrieving form template 225a, generic output data service 151 may retrieve binding data 225c (step 320). Generic data service 151 my traverse form template manager business object 162 to run a query (not shown) in queries and retrievals 221 to retrieve binding data 225c from template data node 225. As described in detail in FIG. 2B, binding data 225c may include information mapping data elements of data schema 225b to data fields in output form template 225a.

Next, generic output data service 151 may retrieve data from business objects listed in output data node 230 (step 330). Referring back to the purchase order example, generic output data service 151 may use the business object ID 230a ("PP51") to run retrieval 221b to retrieve data from business objects listed in output data node 230. Output data node 230 may include a root node 230c, identified as "purchase order header." Output data node 230 may include other business object nodes associated to purchase order business object 230a. Purchase order business object 230a, such as business object with an ID of "PP51," may include queries that access data elements in its business object nodes by following associations defined in purchase order business object 230a and its related business object nodes. An association between business object nodes may be any type of identifier, such as a business object ID number, that may be used as a key to look up one business object node from another business object node. An association may be a link, in a business object node, referring to another business object node, by, for example, identifying the memory address of the referred to business object or business object node. The memory address may be used to access and read data elements of a particular business object or business object node. An association may link a business object to a business object node, or link two business object nodes. A data element in a business object node, such as purchase order header 230c, refers to a unit of data that contains, for example, a data element name, a data element definition, and/or enumerated values.

Figure 3B:
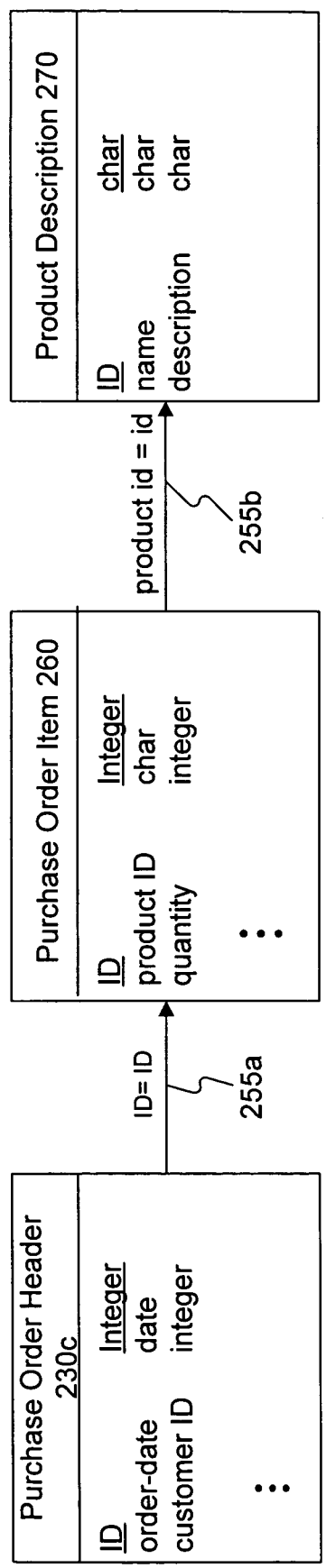
FIG. 3B illustrates another block diagram of a data retrieval by association process for generating an output document consistent with certain aspects related to the present invention.

FIG. 3B further shows a diagram of an exemplary data retrieval by association from business object nodes listed in form output data node 230. FIG. 3B shows three exemplary business object nodes, purchase order header 230c, purchase order item 260, and product description 270, and the associations that may be included in output data node 230. Purchase order header 230c is the root node of business object 230a. Purchase order item 260 and product description 270 are business object nodes associated with root node purchase order header 230c. Business objects and associations such as the ones depicted in FIG. 3B may be stored in repository 160. The business object node associations may include keys 255a and 255b that identify the associations among the business object nodes 250, 260, and 270. For example, key 255a may be a purchase order identification value ("ID") that is used to associate purchase order header 230c to purchase order item 260. Key 255b may associate the product identification values (labeled in FIG. 3B as "product id") of purchase order item 260 to the product identification value (labeled "ID") of product description 270. Generic output data service 151 may first retrieve purchase order header 230c from output data node 230. Generic output data service 151 may then follow the association defined by key 255a to retrieve purchase order item 260. Generic output data service 151 may similarly follow the association defined by key 255b to retrieve product description 270. Generic output data service 151 may then retrieve data elements, such as product ID (e.g., SAP B One) and quantity (e.g., 15), from associated business object node 260, and product description (e.g., AP Business One business/operational management solution), from associated business object node 270, by following associations defined by keys such as 255a and 255b.

Once generic output data service 151 retrieves the data elements from business objects listed in output data node 230, generic output data service 151 may then retrieve data schema 225b from form template data 225 (step 340). Data schema 225b may be an XML schema that defines the structure and the content of an XML data document. Referring back to the purchase order example, an XML data schema 225b may define the data elements of a purchase order document. As shown in Table 1, a purchase order output document may include five data elements: purchase order ID, purchaser order date, purchased quantity, purchased product, and product description. According to purchase order XML schema 225b, generic output data service 151 may then compose an XML data document that contains the retrieved data (retrieved in steps 330) for the requested output purchase order ID (e.g., PP51). Table 2 depicts an exemplary purchase order XML data document conforming to the XML schema depicted in Table 1, and consistent with the data elements in business object nodes of FIG. 3B.

TABLE 2

Purchase Order XML Data Document

| 1 | <Purchase Order<br>xmlns:xsi="www.SAP.com/Example Purchase Order XML Schema-instance"<br>xsi:noNamespaceSchemaLocation="purchaseorder.xsd"> |
| 2 | <Order ID> PP51</Order ID> |
| 3 | <Order Date>12/01/2005</Order Date> |
| 4 | <Product Quantity> 15 </Product Quantity> |
| 5 | <Order Product> SAP B One </Order Product> |
| 6 | <Product Description> SAP Business One business/operational management solution </Product Description> |
| 7 | </Purchase Order> |

The XML data document in Table 2 contains the data of a purchase order with an ID of "PP51." The purchase order was made on Dec. 1, 2005. The purchase order includes fifteen of the software products identified as "SAP B One," which is further described as "SAP Business One business/operational management solution."

After generic output data service 151 has obtained data schema 225b and composed an XML data document accordingly, such as exemplified in Table 2, generic output data service 151 may then generate an output document using binding data 225c (step 350). Again, referring back to the purchase order example, binding data 225c may define the placement of XML data elements, such as "Order ID" and "Product Description" in the output document. As shown earlier in FIG. 2B, form template 225a may define a purchase order summary format in a tabular (e.g. 225f) format with summary lines (e.g., 225e). Form template 225a may further specify that "ordered product" would be the first column and "order date" would be the second column of table 225f, as depicted in FIG. 3c (described further below). Binding data 225c may also define the cardinality of "ordered product." Binding data 225c may define that data element "Product Description" in 225b maps to the "Product" data field in output form template 250a, as well as mappings for other elements.

Based on the XML data document (as shown in Table 2) generated according to data schema 225b, generic output data service 151 may then arrange the data elements in the XML data document (conforming to data schema 225b) according to binding data 225c to generate an output document. An exemplary output document is shown in FIG. 3C consistent with purchase order form template 225a as shown in FIG. 2B, purchase order XML schema 225b as shown in Table 2, and binding data 225c as shown in FIG. 2B. In FIG. 3C, generic data output service 151 may generate an output purchase order document with a summary line 225e (see FIG. 2B) with populated data fields and an output table 225f with rows populated with data from the XML data document described in Table 2.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed is:

1. A method executable on at least one processor, the method comprising:

calling the service to retrieve a template for formatting an output document, the output document having one or more data fields, wherein a form template manager business object is instantiated in response to the call, the form template manager business object having a plurality of nodes comprising: a form template data node including a schema, a binding data, and the template, a form template node including information to identify an instance of the form template manager business object, an output data node listing at least one business object including data used to generate the output document, and a queries and retrieval node to retrieve data from at least one of the form template data node and the output data node, the service traversing the nodes of the form template business object to retrieve the template from the form template data node;

retrieving, by the service, the binding data mapping the one or more data elements to one or more data fields of the output document, the service traversing nodes of the template manager business object to run a query in the queries and retrieval node to retrieve the binding data from the form template data node;

retrieving, by the service, the schema defining one or more data elements, the service traversing nodes of the template manager business object to obtain the schema from the form template data node; and generating the output document formatted based on the retrieved template, the retrieved schema, and the retrieved binding data.

2. The method of claim 1, further comprising: retrieving, by the service, output data for the output document.

3. The method of claim 1, further comprising: retrieving, by the service, output data for the output document by following an association between nodes of a business object.

4. The method of claim 1, wherein calling further comprises: calling, from another service, the service to retrieve the template implemented as a node of an object.

5. The method of claim 4, further comprising: implementing the service as a Web service callable by another service.

6. The method of claim 1, wherein calling further comprises: calling, from another service though a service manager, the service to retrieve the template.

7. A system comprising:
a memory, and a processor configured to:
call the service to retrieve a template for formatting an output document, the output document having one or more data fields, wherein a form template manager business object is instantiated in response to the call, the form template manager business object configured to comprise:
a form template data node including a schema, a binding data, and the template,
a form template node including information to identify an instance of the form template manager business object,
an output data node listing at least one business object including data used to generate the output document, and
a queries and retrieval node to retrieve data from at least one of the form template data node and the output data node;
retrieve, by the service from the form template manager business object, a schema defining one or more data elements,
retrieve, by the service from the form template manager business object, the binding data mapping the one or more data elements to one or more data fields of the output document, and
generate the output document formatted based on the retrieved template, the retrieved schema, and the retrieved binding data.

8. The system of claim 7, further comprising: retrieving, by the service, output data for the output document.

9. The system of claim 7, further comprising: retrieving, by the service, output data for the output document by following an association between nodes of a business object.

10. The system of claim 7, wherein calling further comprises: calling, from another service, the service to retrieve the template.

11. The system of claim 10, further comprising: implementing the service as a Web service callable by another service.

12. The system of claim 7, wherein calling further comprises: calling, from another service though a service manager, the service to retrieve the template implemented as a node of an object.

13. A computer-readable storage medium comprising instructions to configure a computer to implement a method comprising:
calling the service to retrieve a template for formatting an output document, the output document having one or more data fields, wherein a form template manager business object is instantiated in response to the call, the form template manager business object comprising:
a form template data node including a schema, a binding data, and the template,
a form template node including information to identify an instance of the form template manager business object,
an output data node listing at least one business object including data used to generate the output document, and
a queries and retrieval node to retrieve data from at least one of the form template data node and the output data node;
retrieving, by the service from the form template manager business object, the schema defining one or more data elements;
retrieving, by the service from the form template manager business object, the binding data mapping the one or more data elements to one or more data fields of the output document; and
generating the output document formatted based on the retrieved template, the retrieved schema, and the retrieved binding data.

14. The computer-readable storage medium of claim 13, further comprising: retrieving, by the service, output data for the output document.

15. The computer-readable storage medium of claim 13, further comprising: retrieving, by the service, output data for the output document by following an association between nodes of a business object.

16. The computer-readable storage medium of claim 13, wherein calling further comprises: calling, from another service, the service to retrieve the template implemented as a node of an object.

17. The computer-readable storage medium of claim 16, further comprising: implementing the service as a Web service callable by another service.

18. The computer-readable storage medium of claim 13, wherein calling further comprises: calling, from another service though a service manager, the service to retrieve the template implemented as a node of an object.

* * * * *